(12) United States Patent
Cornett et al.

(10) Patent No.: US 6,831,924 B1
(45) Date of Patent: Dec. 14, 2004

(54) VARIABLE MODE BI-DIRECTIONAL AND UNI-DIRECTIONAL COMPUTER COMMUNICATION SYSTEM

(75) Inventors: Frank N. Cornett, Chippewa Falls, WI (US); Philip N. Jenkins, Eau Claire, WI (US); Terrance L. Bowman, Sumner, WA (US); Joseph M. Placek, Chippewa Falls, WI (US); Gregory M. Thorson, Altoona, WI (US)

(73) Assignee: Silicon Graphics, Inc., Mountain View, CA (US)

(*) Notice: Subject to any disclaimer, the term of this patent is extended or adjusted under 35 U.S.C. 154(b) by 774 days.

(21) Appl. No.: 09/620,333

(22) Filed: Jul. 20, 2000

(51) Int. Cl.[7] ............................................. H04L 12/56
(52) U.S. Cl. ......................... 370/419; 370/282; 710/20
(58) Field of Search ............................... 370/540, 284, 370/276, 447, 419, 282; 710/20, 52, 305, 129, 8; 375/222, 220, 219; 398/152

(56) References Cited

U.S. PATENT DOCUMENTS

| | | | |
|---|---|---|---|
| 4,375,051 A | 2/1983 | Theall .......................... 333/17 |
| 4,477,713 A | 10/1984 | Cook et al. ............. 219/124.34 |
| 4,514,749 A | 4/1985 | Shoji ........................... 357/68 |
| 4,523,310 A * | 6/1985 | Brown et al. ................ 370/540 |
| 4,587,445 A | 5/1986 | Kanuma ...................... 307/443 |
| 4,823,184 A | 4/1989 | Belmares-Sarabia et al. . 358/27 |
| 4,896,272 A | 1/1990 | Kurosawa ................... 364/491 |
| 4,926,066 A | 5/1990 | Maini et al. ............. 307/303.1 |
| 5,194,765 A | 3/1993 | Dunlop et al. .............. 307/443 |
| 5,295,132 A | 3/1994 | Hashimoto et al. ........... 370/13 |
| 5,315,175 A | 5/1994 | Langner ...................... 307/443 |
| 5,394,528 A | 2/1995 | Kobayashi et al. .......... 395/325 |
| 5,416,606 A | 5/1995 | Katayama et al. .......... 358/467 |
| 5,481,567 A | 1/1996 | Betts et al. .................. 375/261 |
| 5,490,252 A | 2/1996 | Macera et al. ........... 395/200.1 |
| 5,502,733 A | 3/1996 | Kishi et al. .................. 714/748 |
| 5,506,953 A | 4/1996 | Dao ............................ 395/166 |
| 5,521,836 A | 5/1996 | Hartong et al. ............. 364/491 |
| 5,535,223 A | 7/1996 | Horstmann et al. ........... 371/27 |
| 5,544,203 A | 8/1996 | Casasanta et al. .......... 375/376 |
| 5,555,188 A | 9/1996 | Chakradhar ................. 364/490 |
| 5,603,056 A | 2/1997 | Totani ......................... 395/828 |
| 5,604,450 A | 2/1997 | Borkar et al. ................. 326/82 |
| 5,617,537 A | 4/1997 | Yamada et al. ......... 395/200.01 |
| 5,623,611 A * | 4/1997 | Matsukawa et al. .......... 710/52 |
| 5,631,611 A | 5/1997 | Luu ........................... 333/17.3 |
| 5,657,346 A | 8/1997 | Lordi et al. ................. 375/224 |
| 5,682,512 A | 10/1997 | Tetrick ........................ 395/412 |
| 5,748,547 A | 5/1998 | Shau ........................... 365/222 |
| 5,757,658 A | 5/1998 | Rodman et al. ............. 364/491 |
| 5,778,308 A | 7/1998 | Sroka et al. ................. 455/115 |
| 5,778,429 A | 7/1998 | Sukegawa et al. .......... 711/129 |
| 5,784,706 A | 7/1998 | Oberlin et al. .............. 711/202 |
| 5,787,268 A | 7/1998 | Sugiyama et al. .......... 395/500 |
| 5,793,259 A | 8/1998 | Chengson .................... 331/78 |
| 5,811,997 A | 9/1998 | Chengson et al. .......... 327/112 |
| 5,828,833 A | 10/1998 | Belville et al. ......... 395/187.01 |
| 5,844,954 A | 12/1998 | Casasanta et al. .......... 375/373 |
| 5,847,592 A | 12/1998 | Gleim et al. ................ 327/403 |

(List continued on next page.)

OTHER PUBLICATIONS

*Lattice Semiconductor Corporation*, http://www.latticesemi.com,(2002),7 pgs.

(List continued on next page.)

*Primary Examiner*—John Pezzlo
(74) *Attorney, Agent, or Firm*—Schwegman, Lundberg, Woessner & Kluth, P.A.

(57) ABSTRACT

A variable communication systems comprising a plurality of transceivers and a control circuit connected to the transceivers to configure the transceivers to operate in a bi-directional mode and a uni-directional mode at different times using different transfer methods to transfer data.

31 Claims, 10 Drawing Sheets

U.S. PATENT DOCUMENTS

| | | | | |
|---|---|---|---|---|
| 5,898,729 | A | 4/1999 | Boezen et al. | 375/259 |
| 5,910,898 | A | 6/1999 | Johannsen | 364/489 |
| 5,915,104 | A | 6/1999 | Miller | 395/309 |
| 5,929,717 | A | 7/1999 | Richardson et al. | 333/17.3 |
| 5,978,953 | A | 11/1999 | Olarig | 714/768 |
| 6,005,895 | A | 12/1999 | Perino et al. | 375/288 |
| 6,016,553 | A | 1/2000 | Schneider et al. | 714/21 |
| 6,272,651 | B1 | 8/2001 | Chin et al. | 714/43 |
| 6,310,815 | B1 | 10/2001 | Yamagata et al. | 365/230.03 |
| 6,363,502 | B1 | 3/2002 | Jeddeloh | 714/52 |
| 6,412,056 | B1 | 6/2002 | Gharachorloo et al. | 711/202 |
| 6,487,685 | B1 | 11/2002 | Fiske et al. | 714/701 |
| 6,564,269 | B1 * | 5/2003 | Martin | 710/20 |

OTHER PUBLICATIONS

"Dynamic Datapath Selection for Unpredictable Transger Starts", *IBM Technical Disclosure Bulletin*, TBA–ACC–NO: NA9402589, Issue No:2A, Cross Reference: 0018–8689–37–2A–589,(1994),589–592.

"Dynamic Switch to Data Slow Mode on a Memory Card", *IBM Technical Disclosure Bulletin*, 37, NA9402637,(1994), 321–322.

"Low Power Quad Differential Line Driver with Cut–Off", *National Semiconductor, F100K ECL 300 Series Databook and Design Guide*, pp. 2–54—2–60. (1992).

"Memory Card Data Fastpath", *IBM Technical Disclosure Bulletin*, 37, TDB–ACC–NO: NA9402637, Issue No: 2A, Cross Reference: 0018–8689–37–2A–637,(1994),637–638.

"The SA27 library includes programmable delay elements DELAYMUXO and DELAYMUXN. How are these cells used?", *IBM Delaymuxn Book*, (Feb. 1999),pp.1–6.

Brewer, Kevan, "Re: Memory mapped registers", (Online): comp.arch.embedded, (May 2, 1996).

Djordjevic, A. R., et al., "Time Domain Response of Multiconductor Transmission Lines", *Proceedings of the IEEE*, 75(6), (Jun. 1987),743–64.

Gjessing, et al., "Performance of the RamLink Memory Architecture", *Proceedings HICSS'94*, (1994), 154–162.

Gjessing, Stein, et al., "RamLink: A High–BandwidthPoint-to–Point Memory Architecture", *Proceeding CompCon*, (1992),328/331.

IEEE STD, "IEEE Standard for High–Bandwidth Memory Interface Based on Scalable Coherent Interface(SCI) Signaling Technology (RAMLink)", *IEEE Std. 1596.4–1996*, (1996), 1–91.

Im, G., et al., "Bandwidth–Efficient Digital Transmission over Unshielded Twisted–Pair Wiring", *IEEE Journal on Selected Areas in Communications*, 13(9), (Dec. 1995) 1643–1655.

Mooney, Randy, et al., "A 900 Mb/s Bidirectional Signaling Scheme", *IEEE Journal of Solid–State Circuits*, 30(12), (Dec. 1995), 1538–1543.

Rao, A., "Memory mapped registers", new://comp.arch.ambedded, (Apr. 27, 1996).

Takahashi, T., et al., "110GB/s Simultaneous Bi–Directional Transceiver Logic Synchronized with a System Clock", *IEEE International Solid–State Circuits Conference*, (1999), 176–177.

* cited by examiner

VARIABLE MODE BI-DIRECTIONAL AND UNI-DIRECTIONAL COMPUTER COMMUNICATION SYSTEM

STATEMENT OF RIGHTS IN INVENTION

The United States Government has rights to use this invention pursuant to subcontract B338314 issued by the University of California, which operates Lawrence Livermore National Laboratory for the United States Department of Energy under Contract No. W-7405-ENG-48.

TECHNICAL FIELD OF THE INVENTION

The present invention relates generally to communication of digital information, and in particular to communication between communication systems having different operating modes.

BACKGROUND OF THE INVENTION

Every computer has some type of communication system. The communication system allows the computer to communicate with external devices or with other communication systems of other computers. Communication between computers involves transmitting and receiving data between them via communication lines. Typically, communication systems communicate with each other in two modes, a uni-directional and a bi-directional mode. In a uni-directional mode, the communication system transmits data on one communication line in one direction and receives data on a separate communication line in another direction. In a bi-directional mode, the communication system transmits and receives data on the same communication line simultaneously in both directions.

In some cases, a problem arises when two communication systems having different communicating mode needs to communicate with each other. For instance, a problem arises when a new generation of a communication system capable of operating in a bi-directional mode needs to communicate with an older generation of a communication system capable of operating only in a uni-directional mode. The problem can be caused by incompatibility between the systems with respect to system protocol, termination of communication lines, wire routing and signaling.

There is a need for a method to solve the incompatibility problem to enable a communication system capable of operating in a bi-directional mode to communicate with a communication system capable of operating only in a uni-directional mode.

SUMMARY OF THE INVENTION

The present invention provides a variable mode bi-directional and uni-directional communication system. The communication system can be configured to communicate with another computer capable of operating in a bi-directional mode or a uni-directional mode.

In one aspect, communication system includes a plurality of transceivers connected to a control circuit. The control circuit configures the transceivers to operate in a bi-directional mode and a uni-directional mode at different times using different transfer methods to transfer data on the communication lines.

Another aspect providing a method of configuring a communication system is provided, the method includes receiving a mode signal to switch the communication system from operating in a bi-directional mode to operating in a uni-directional mode. The method also includes switching a first group of transceivers from simultaneously receiving and transmitting data on a first group of communication lines to receiving data only on a first group of communication lines. The method further includes switching a second group of transceivers from simultaneously receiving and transmitting data on a first group of communication lines to transmitting data only on a second group of communication lines.

DETAILED DESCRIPTION OF THE INVENTION

The following detailed description refers to the accompanying drawings which form a part hereof, and shows by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the invention is defined only by the appended claims.

Figure 1:
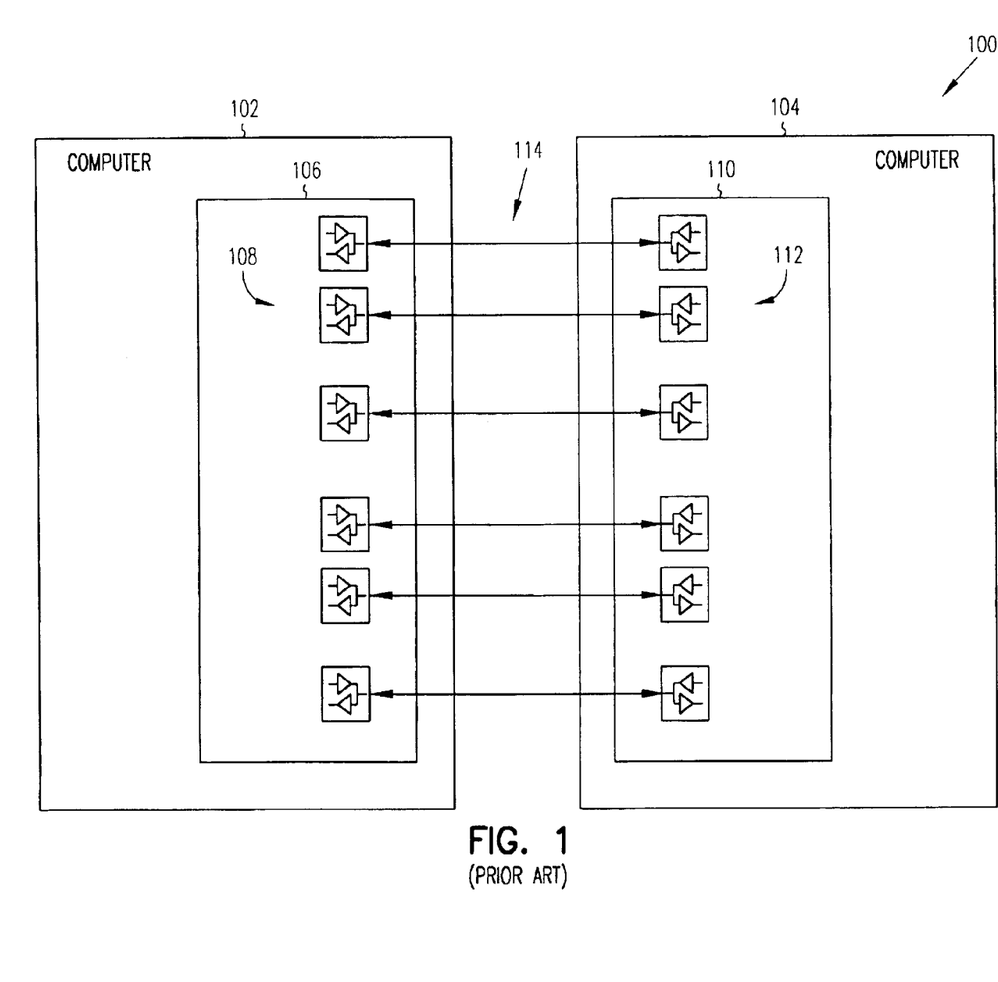
FIG. 1 is a block diagram illustrating a prior art computing system.

FIG. 1 is a block diagram illustrating a prior art computing system 100 communicating in a bi-directional mode. System 100 includes a first computer 102 and a second computer 104. Computer 102 has a communication system 106. Communication system 106 has a plurality of transceivers 108. Similarly, Computers 104 has a communication system 110, which includes a plurality of transceivers 112. Computers 102 and 104 communicate with each other via a plurality of communication lines 114. Both communication systems 106 and 110 are constructed the same and operate in the same manner. They allow computers 102 and 104 to transmit and receive data on each of the communication lines simultaneously in both directions between the computers. Since both communication systems 102 and 104 transmit and receive data simultaneously on the same communication line, they are operating in bi-directional mode.

Figure 2:
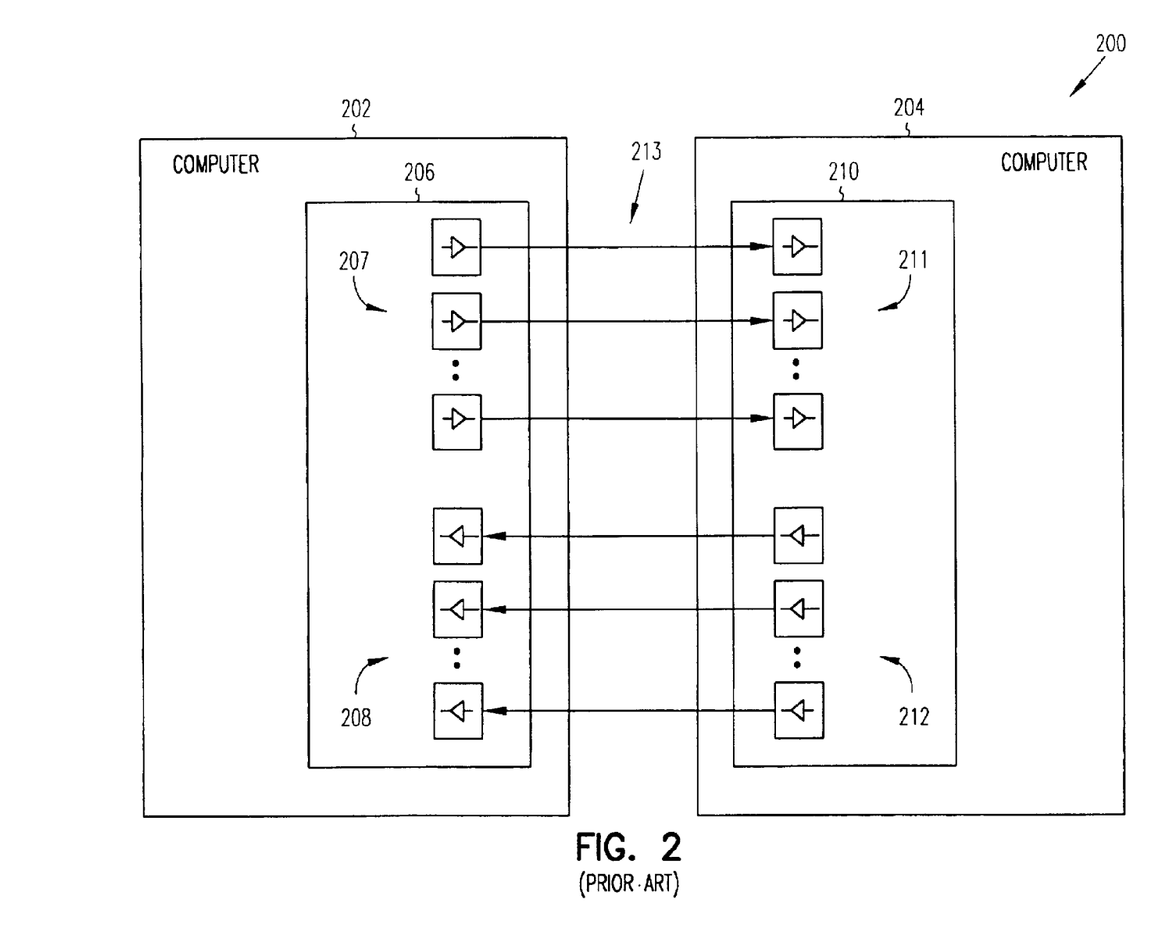
FIG. 2 is a block diagram illustrating another prior art computing system.

FIG. 2 is a block diagram illustrating another prior art computing system 200 communicating in a uni-directional mode. System 200 includes a first computer 202 and a second computer 204. Computer 202 has a communication system 206, which includes a plurality of transmitters 207, and a plurality of receivers 208. Similarly, Computers 204 includes a communication system 210, which includes a plurality of transmitters 211, and a plurality of receivers 212. Computers 202 and 204 communicate with each other via a plurality of communication lines 213. In this arrangement, one communication line is used to transmit data and a separate communication line is used to receive data. Thus, communication systems 206 and 210 in this case are operating in uni-directional mode.

Figure 3:
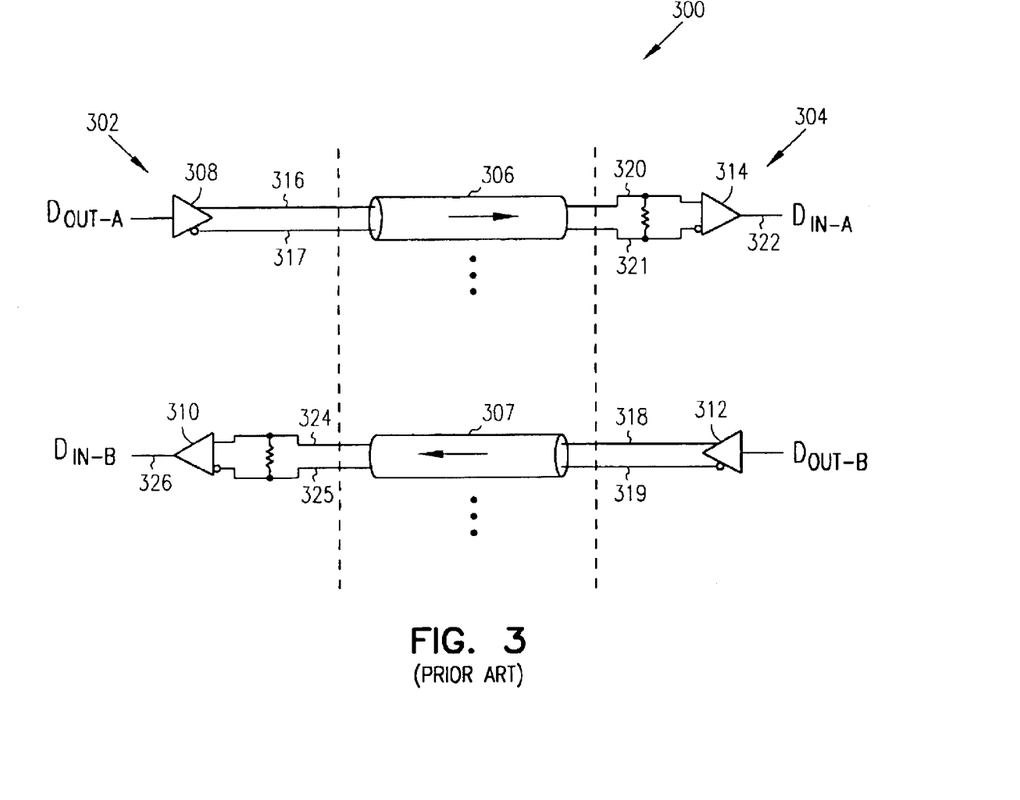
FIG. 3 is a block diagram illustrating two computers communicating in a uni-directional mode according to the prior art.

FIG. 3 is a block diagram representing two computers communicating in a uni-directional mode. Communication systems 302 and 304 are communicating via a plurality of communication lines 306. For simplicity, each communication system is only shown with one transmitter and one receiver connected by a communication line. In the figure, communication system 302 includes a transmitter 308 and a receiver 310. Communication system 304 includes a transmitter 312 and a receiver 314. Transmitter 308 connects to receiver 314 via communication line 306. Transmitter 312 connects to receiver 310 via communication line 307. Transmitter 308 receives output data signal Dout-a and generates differential signals, which include a true Dout-a signal and a complement Dout signal. The true Dout-a signal is provided on line 316 and the complement Dout-a signal is provided on line 317. The differential signals are provided to communication line 306 for transferring data to receiver 314. Similarly, transmitter 312 receives output data signal Dout-b and generates a true Dout-b signal on line 318 and a complement Dout-b signal on line 319. Receiver 314 receives the true and complement of Dout-a signal on lines 320 and 321 and generates a signal Din-a on line 322 representing the true Dout-a signal. Similarly, receiver 310 receives the true and complement of Dout-b signal on line 324 and 325 and generates a signal Din-b on line 326 representing the true Dout-b signal.

Figure 4:
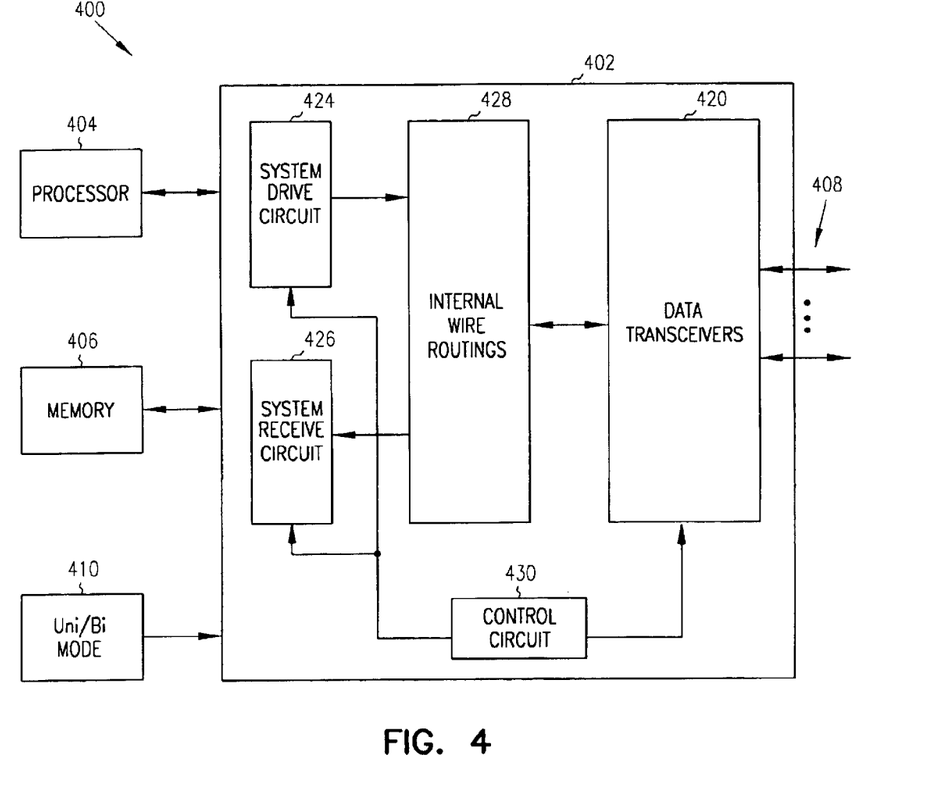
FIG. 4 is a block diagram illustrating a computing system according to an embodiment of the invention

FIG. 4 is a block diagram illustrating a computer 400 according to an embodiment of the invention. Computer 400 includes a communication system 402 connected to at least one processor 404, a memory 406, and a plurality of communication lines 408. Communication system 400 is also connected to a Uni-directional/Bi-directional (Uni/Bi) mode register 410. Communication system 402 includes a plurality of transceivers 420 connected to a system drive circuit 424 and a system receive circuit 426 through internal wire routings 428. A control circuit 430 provides control signals to transceivers 420 for communication with communication lines 408. Control circuit 430 also provides control signals to drive circuit 424 and receive circuit 426 to control data transfer between them and transceivers 420 through wire routings 428. Those of ordinary skill in the art will readily recognize that computer 400 of FIG. 4 is simplified to illustrate the present invention and is not intended to be a detailed description of all of the features of a computer.

When communication system 402 is connected to a communication system operating in a bi-directional mode, Uni/Bi mode register 410 is set to a bi-directional mode. When communication system 402 is connected to a communication system operating in a uni-directional mode, Uni/Bi mode register 410 is set to a uni-directional mode. In the uni-directional mode, Uni/Bi mode register 410 sends a uni-directional mode signal to communication system 402.

Control circuit 430 of communication system 402 receives the mode signal and switches transceivers 420 to transfer data on communication lines using different transfer methods. One transfer method includes receiving and transmitting data simultaneously on the same communication line. The other transfer method includes receiving data on one communication line and transmitting data on a separate communication line. In addition, when switched from a bi-directional mode to a uni-directional mode, control circuit 430 causes drive circuit 424 and receive circuit 426 to disable some of the communication signals to reconfigure internal wire routings 428 for operating in the uni-directional mode.

Figure 5:
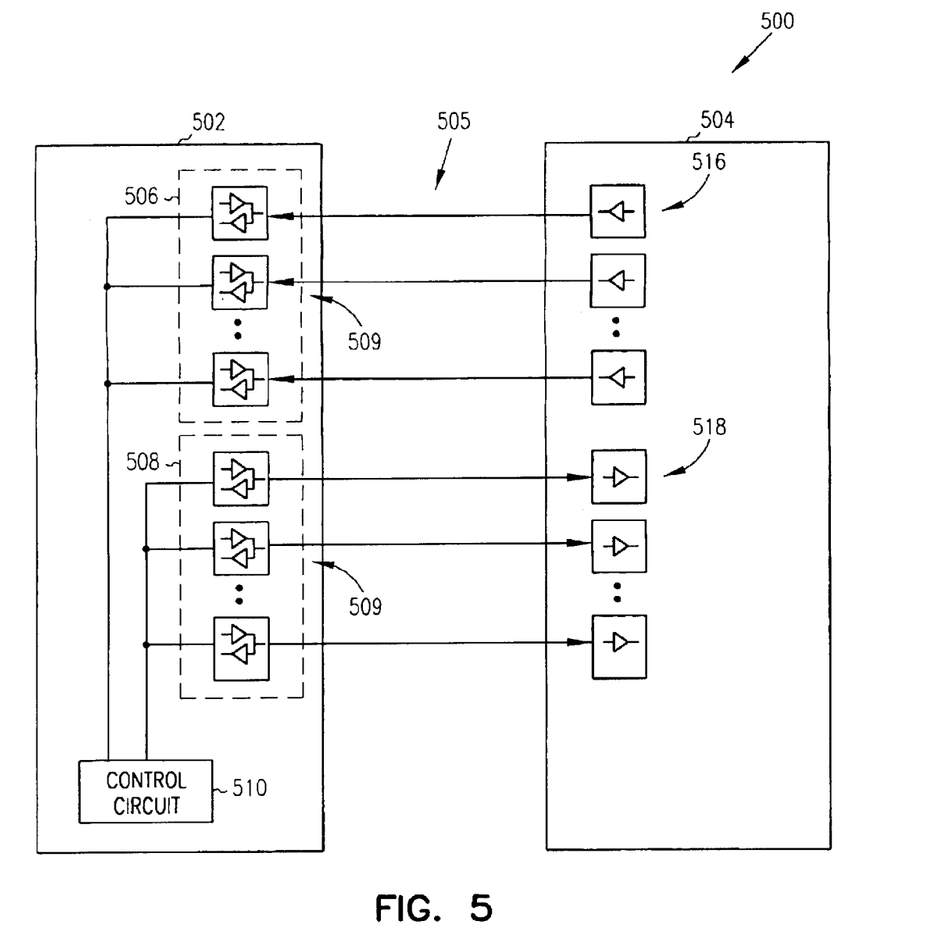
FIG. 5 is a block diagram of a computer according to an embodiment of the invention.

FIG. 5 is a block diagram illustrating a computing system 500 according to an embodiment of the invention. Computing system 500 includes a first communication system 502 connected to second communication system 504 via a plurality of communication lines 505. Communication system 502 represents communication system 402 of FIG. 4 and is shown in a simplified form. Communication system 502 includes a plurality of transceivers 509. When connected to a communication system capable of operating only in a uni-directional mode, such as communication system 504, transceivers 509 are divided into two groups: a first group 506 and a second group 508. Both groups 506 and 508 are connected to a control circuit 510. Communication system 504 includes a plurality of transmitters 516 and a plurality of receivers 518. In FIG. 5, communication system 502 is configured to operate in a uni-directional mode. When operating in this mode, the first group of transceivers 506 is configured to operate as receivers to receive incoming data on communication lines 505. Each of the transceivers 509 includes a transmitting circuit (shown in detail in FIG. 6). The transmitting circuit provides the correct static termination of each line 505. The second group of transceivers 508 is configured to operate as transmitters to transmit data on communication lines 505.

Figure 6:
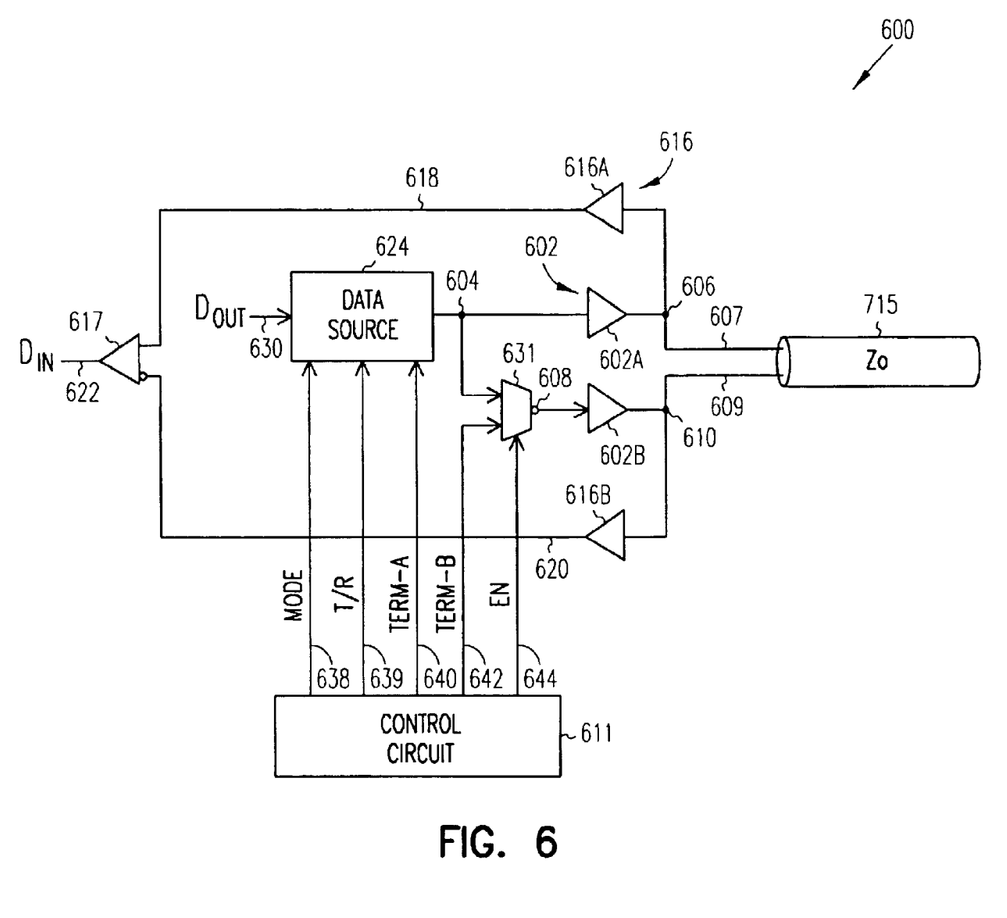
FIG. 6 is a block diagram of a transceiver according to an embodiment of the invention.

FIG. 6 is a block diagram of a transceiver 600 according to an embodiment of the invention. Transceiver 600 represents one of the transceivers 509 of in FIG. 5. Transceiver 600 includes a transmitting circuit 602 having outputs at nodes 606 and 610. Transmitting circuit 602 includes a first transmitter 602a and a second transmitter 602b. Transmitter 602a includes an input connected to node 604, and an output connected to node 606. Transmitter 602b includes an input connected to node 608, and an output connected to node 610. The outputs of transmitters 602a–b at nodes 606 and 610 are connected to communication line 603 through lines 607 and 609.

Transceiver 600 also includes a receiving circuit 616 having inputs at connected to node 606 and 610. Receiving circuit 616 includes a first receiver 616a, a second receiver 616b and a differential receiver 617. Receiver 616a includes an input connected to node 606, and an output connected to line 618. Receiver 616b includes an input connected to node 610, and an output connected to line 620. The inputs of receivers 616a and 616b are also connected to communication line 603 through lines 607 and 609. Differential receiver 617 is connected to lines 618 and 620 to receive signals from the outputs of receivers 616a and 616b and generates an input data signal Din on line 622.

In addition, transceiver 600 also includes a data source circuit 624 and a selection circuit or multiplexor 631. Data source circuit 624 includes an input at line 630 for receiving a data output signal Dout, and output connected to node 604 for producing an output signal. Multiplexor 631 includes inputs connected to node 604 and line 642 and an inverted output connected to node 608.

A control circuit 611 is connected to provide control signals to transceiver 600 via lines 638, 639, 640, 642 and 644. The control signals include a mode signal MODE provided on line 638, first and second terminating signals TERMa and TERMb provided on lines 640 and 642, and an enable signal EN provided on line 644. At different times, control circuit 611 produces different combinations of the control signals to cause transceiver 600 to operate differently and use different transfer method in the uni-directional and bi-directional modes.

In a first combination of control signals, control circuit 611 activates MODE signal on line 638 to a first signal level. This causes transceiver 600 to operate in a bi-directional mode using the first transfer method. In the first transfer method, transceiver 600 transmits and receives data simultaneously on communication line 603. Also in the bi-directional mode, data source circuit 624 receives output data signal Dout and transfers it to node 604. Signal EN is activated to a first signal level to enable multiplexor 631 to select data signal Dout and outputs a complement of Dout signal to node 608. Transmitters 602a and 602b subsequently transfer the data signals from nodes 604 and 608 to nodes 606 and 610 as differential signals, which are to be transmitted on communication line 603. In the bi-directional mode, incoming signals from communication line 603 are simultaneously transmitted to transceiver 600 and received by receivers 616a–b, then routed to Din signal on line 622.

In a second combination of control signals, control circuit 611 activates MODE signal on line 638 to a second signal level. This causes transceiver 600 to operate in a uni-directional mode using the second transfer method. In the second transfer method, transceiver 600 operates as either a receiver to only receive data, or as a transmitter to only transmit data. In the uni-directional mode, control circuit 611 activates signal T/R to one of two signal levels to select the operation of transceiver 600. A first signal level of T/R signal causes transceiver 600 to operate as a receiver. A second signal level of T/R signal causes transceiver 600 to operate as a transmitter. When transceiver 600 operates as a receiver, signal Dout is static. Data source circuit 624 receives signal TERMa and outputs it to node 604. Signal EN is activated to a second signal level to enable multiplexor 631 to select signal TERMb signals to node 608. In this mode, transmitters 602a–b are used to perform a resistive terminating function to transfer TERMa and TERMb to nodes 606 and 610. Receivers 616a–b and 617 are used to receive data from communication line 603. When transceiver 600 is selected to operate as a transmitter, data source circuit 624 receives output data signal Dout and transfers it to node 604. Signal EN is activated to the first state to enable multiplexor to select data signal Dout to node 608. Transmitters 602a and 602b subsequently transfer the data signal on nodes 604 and 608 to nodes 606 and 610 as differential signals. In this case, receivers 616a–b and 617 are not used.

Figure 7A:
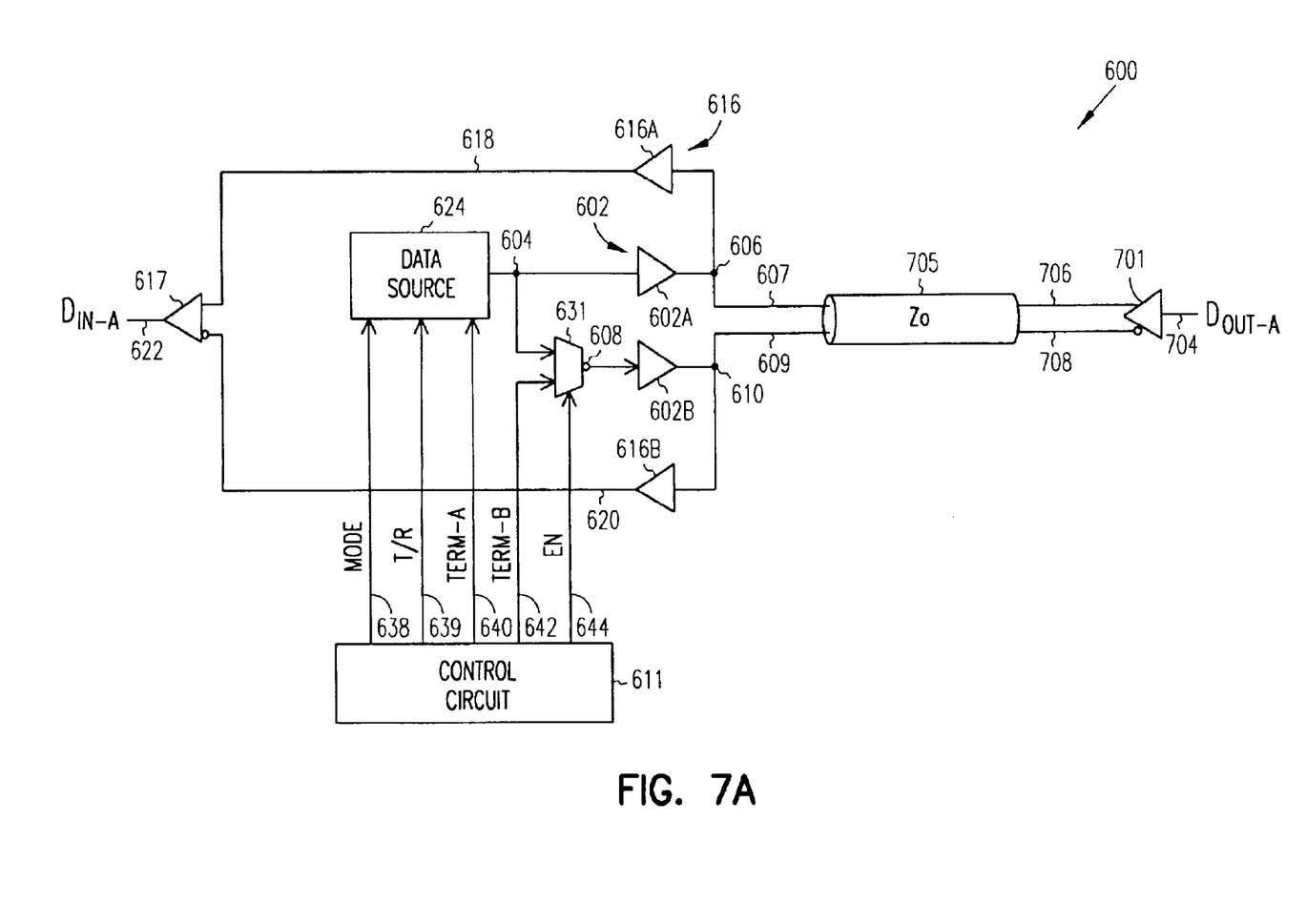
FIG. 7A is a block diagram illustrating the transceiver of FIG. 6 connected to operate as a receiver to a transmitter.

FIG. 7A is a block diagram illustrating transceiver 600 of FIG. 6 connected to a transmitter 701 to operate as a receiver. Transmitter 701 represents one of the transmitter 516 of FIG. 5. Transceiver 600 is connected to transmitter 701 via communication line 705. Transmitter 701 includes an input at line 704 for receiving an output data signal Dout-a to generate differential signals on lines 706 and 708. Communication line 705 carries the differential signals to lines 607 and 609 of transceiver 600. As shown in FIG. 7A, transceiver 600 and transmitter 701 each includes a pair of lines connected to communication line 705, indicated by the pair of lines 607 and 609 and the pair of lines 706 and 708. The pair of lines allows a data signal to be transferred as differential signals on both ends of communication line 705. One signal represents the true signal carried by one line of the pair, and the other signal represents the complement signal carried by the other line of the pair. Since transceiver 600 and transmitter 701 each includes a pair of lines connected to communication line, the characteristic of signals transmitted from transmitter 701 is properly preserved by transceiver 600. Transceiver 600 provides a terminating function such that output resistance Ro of lines 607 and 609 matches resistance Zo of communication line 705. Since Ro matches Zo, signals transmitted on lines 706 and 708 are properly received by lines 607 and 609.

Transmitters 602a and 602b perform a terminating function at nodes 606 and 610 to prevent a reflection and distortion of signals transmitted from transmitter 701. The terminating function set the value of Ro to be equaled to the value of Zo. Ro remains the same at different terminating voltage or signal levels produce by transmitters 602a and 602b at nodes 606 and 610. The value of Ro is between 50–60 ohms. The different signal levels at nodes 606 and 610 include a high signal level or a low level signal. The high signal level (HIGH) corresponds to a binary 1, and the low signal level (LOW) corresponds to a binary 0.

The terminating signal level at the output of transmitter 602a at node 606 is controlled by the signal at node 604. Signal level at node 604 is determined by signal level of TERMa when transceiver 600 operates as a receiver. The terminating signal level at the output of transmitter 602b at node 610 is controlled by TERMb signal on line 642. Thus, outputs at nodes 606 and 610 of transmitters 602a and 602b provide four possible combinations of terminating signal levels (four binary combinations of TERMa and TERMb signals). Each of the four combinations of terminating signal levels provides the same output resistance Ro at nodes 606 and 610 to match the resistance Zo of communication line 705.

The terminating signal levels at nodes 606 and 610 can be set to any of the four combinations of terminating signal levels. For example, to set a terminating signal level at both nodes 606 and 610 HIGH, control circuit 611 activates TERMa signal on line 640 HIGH and TERMb signal on line 642 LOW. Data source circuit 624 receives the TERMa signal and outputs it to node 604. Signal EN is activated to a second level to enable multiplexor 631 to select signal level (now at LOW) on line 642 to its output at node 608. Since the output of multiplexor is inverted, node 608 becomes HIGH. Now both node 604 and 608 are HIGH, transmitters 602a–b subsequently output both HIGH level signals to node 606 and 610 and effectively terminate the nodes with HIGH signal level. In a similar terminating function, other combinations of terminating signal levels can also be selected to provide proper termination at node 606 and 610. For examples, other combinations of LOW/HIGH, HIGH/LOW or LOW/LOW can also be selected by applied appropriate terminating signal levels on lines 640 and 642. Each of the four combinations of terminating levels provides proper termination at the outputs of transmitters 602a–b.

Referring to FIG. 7A, when transceiver 600 operates as a receiver, transmitting circuit 602 operates to perform the terminating function, and receiving circuit 616 operates to receive data transmitted on communication line 705 from transmitter 701. In operation, transmitter 701 receives output data signal Dout-a on line 704 and generates different signals on lines 706 and 708. The differential signals include a true Dout-a signal, provided on line 706, and a complement D-out signal provided on line 708. The true and complement Dout-a signals are transmitted to lines 607 and 609. Transceiver 600 receives the true Dout-a signal at receiver 616a and receives the complement Dout-a signal at receiver 616b. Subsequently, both receivers 616a–b transmits the true and complement Dout-a signals on lines 618 and 620 to differential receiver 617, which produces an input signal Din-a representing the true Dout-a signal on line 622.

Figure 7B:
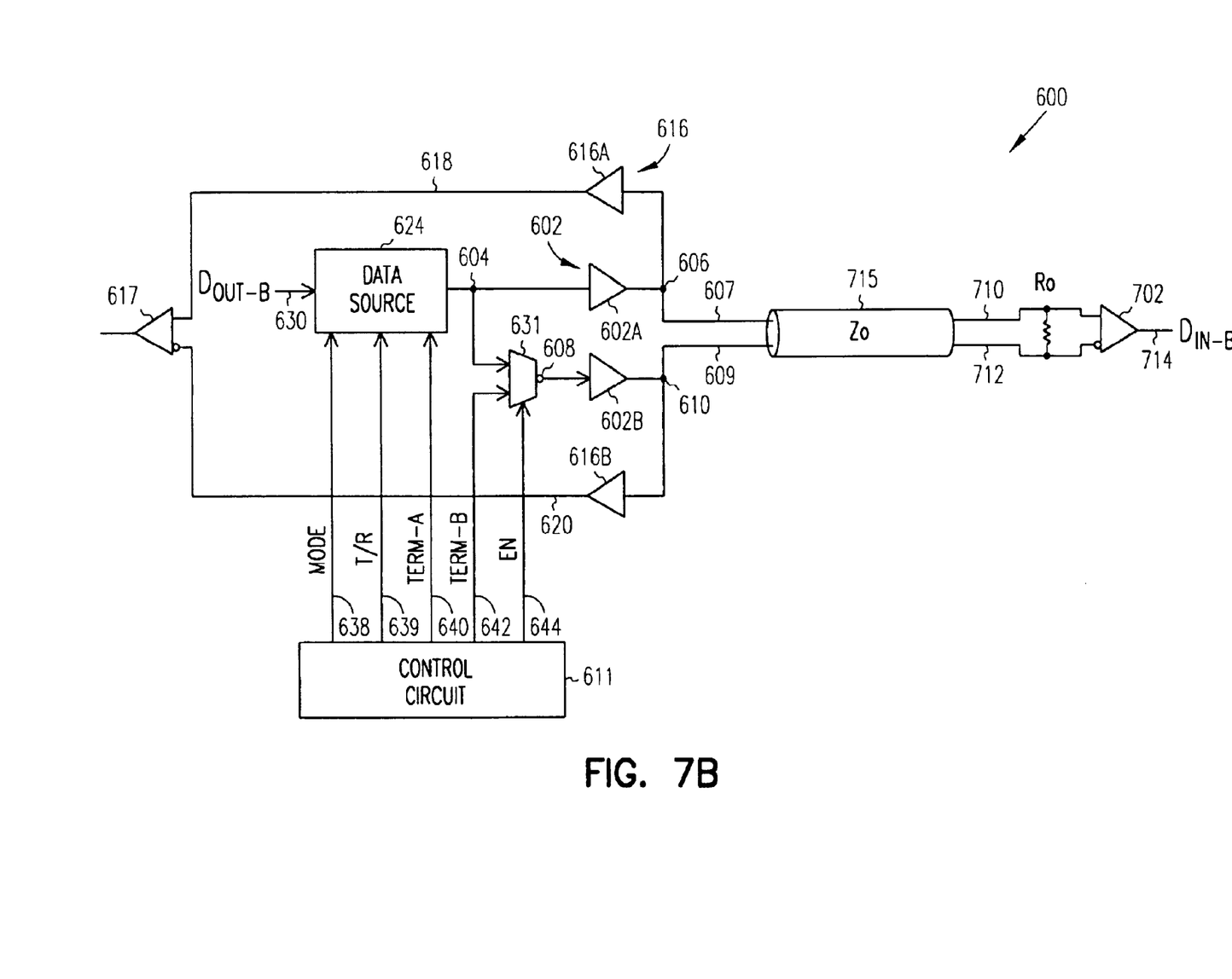
FIG. 7B is a block diagram illustrating the transceiver of FIG. 6 connected to operate as a transmitter to a receiver.

FIG. 7B is a block diagram illustrating transceiver 600 of FIG. 6 connected to operate as a transmitter to a receiver 702. Receiver 702 represents one of the receivers 518 of FIG. 5. Receiver 702 and transceiver 600 are connected by a communication line 715. Receiver 702 includes a pair of lines 710 and 712. Line 710 receives signal transmitted from line 607 and line 712 receives signal transmitted from line 609, and generates an output signal Din-b on line 714. Receiver 702 provides a proper termination, which matches resistance on nodes 606 and 610 to communication line 715. Since receiver 702 also provides proper termination by matching its input resistance Ro the resistance Zo of communication line 715, signals transmitted on lines 607 and 609 are properly received by line 710 and 712 of receiver 715.

When transceiver 600 operates as a transmitter, transmitting circuit 602 operates to transmit an output data Dout-b to communication line 715. Receiving circuit 616 including 616a–b and 617 are not used. In operation, data source circuit 624 receives Dout-b signal and outputs it to node 604. Signal EN is activated to a first signal level to enable multiplexor 631 to select the signal at node 604 to its output at node 608. Since multiplexor 631 has an inverted output, signal on node 608 is an inverted version or complement of the data signal on node 604. Transmitters 602a and 602b output signals from nodes 604 and 608 to nodes 606 and 610. At this point, the Dout signal becomes differential signals. A true signal of Dout-b is presented at node 606, and a complement signal of Dout-b is presented at node 610. The differential Dout-b signals are transmitted to lines 607 and 609. Subsequently, receiver 702 receives the true and complement Dout-b signals on lines 710 and 712 and generates an input signal representing the true data signal Dout-b as Din-b on line 714.

Figure 8:
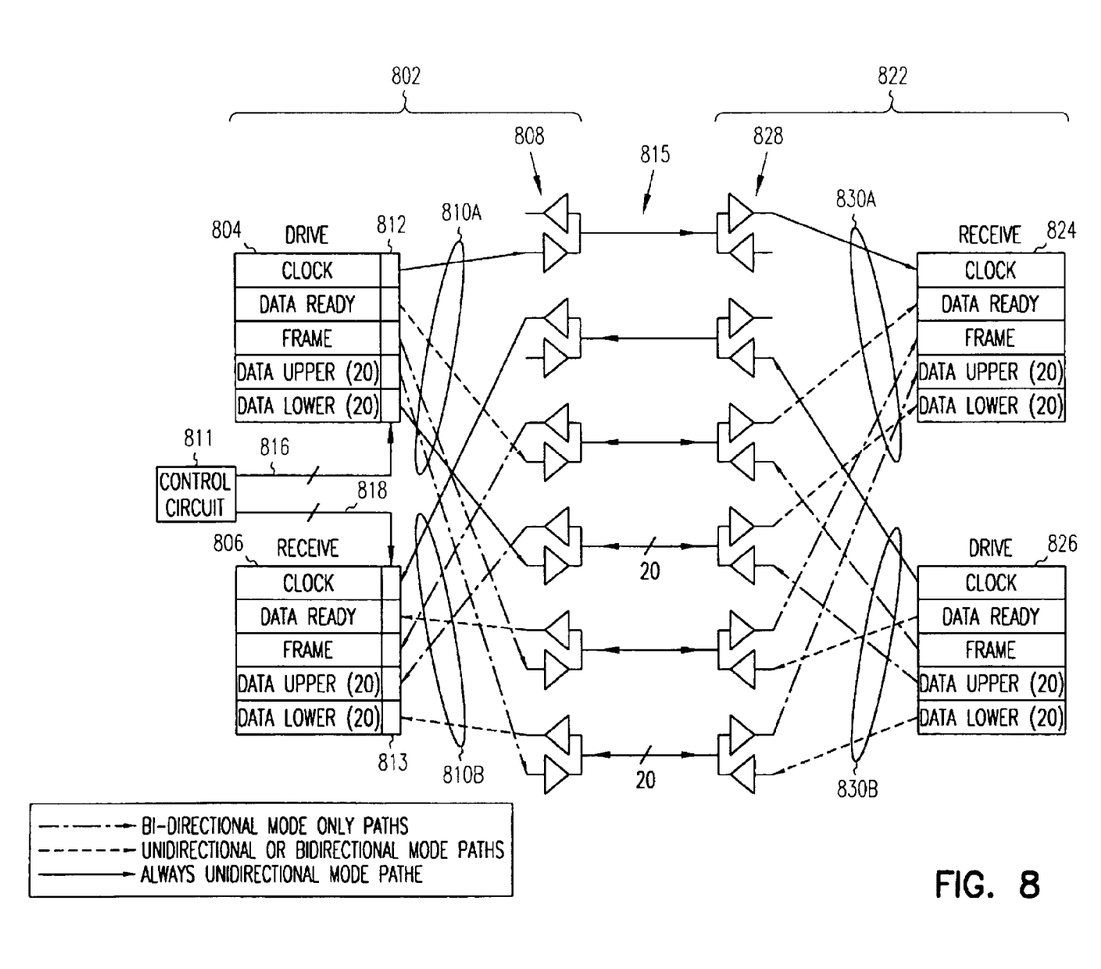
FIG. 8 is a block diagram showing one implementation of internal wire routings in a first mode according to an embodiment of the invention.

FIG. 8 is a block diagram showing one implementation of internal wire routings according to an embodiment of the invention. A communication system 802 includes a system drive circuit 804 and a system receive circuit 806 connected to plurality of transceivers 808 through a plurality of internal wire routings 810a and 810b. A control circuit 811 is connected to switching circuit 812 and 813 via lines 816 and 818. Communication system 802 represents communication system 402 of FIG. 4 and is shown in a different form. Wire routings 810a–b enable the transfer of communication signals between transceivers 808 and a drive circuit 804 and a receive circuit 806. The communication signals include Clock, Data Ready, Frame, Data Upper and Data Lower signals. As shown in FIG. 8, some of the wire routings can be used in both uni-directional and bi-directional modes, indicated by dashed arrows, while some other wire routings can only be used in either a bi-directional mode (indicated by dash-dot arrows) or a uni-directional mode (indicated by solid arrows). Internal wire routings 810a–b can be configured when communication system 802 is connected with another communication system operating a uni-directional mode. In this case, control circuit 811 disables selected communication signals by sending control signals to switching circuit 812 and 813 via line 816 and 818.

Communication system 802 is connected to communicate with another communication system 822 via a plurality of communication lines 815. Similarly to communication system 802, communication system 822 includes a driver 824 and a receiver 826 connected to plurality of transceivers 828 through a plurality of routing paths 830a and 830b. Communication system 822 also includes the same communication signals as that of communication system 802. In one embodiment, communication lines comprise 44 lines including two groups of 20 for data signals (total 40 data signals), two for the Clock signals and two for the Frame signals. In one embodiment, each of the communication line 815 includes two wires (wire pair). Each wire pair carries two signals simultaneously, one signal in each direction. Thus, in one simultaneous transfer, communication line 815 can carry up to 80 data signals (40 wires×2 data signals/wire pair).

Communication system 802 and 822 are capable of operating in both bi-directional and uni-directional modes. When operating in a bi-directional mode, communication signals, except the clock signals, are transferred on communication lines 815 simultaneously in both directions. The data is transferred at a predetermined rate of X bits of data per second (X bits/s), in each direction on each of the communication line 815. Thus, in a simultaneous transfer, communication lines 815 can transfer 80 times X bits of data (80X data signals) per second.

Figure 9:
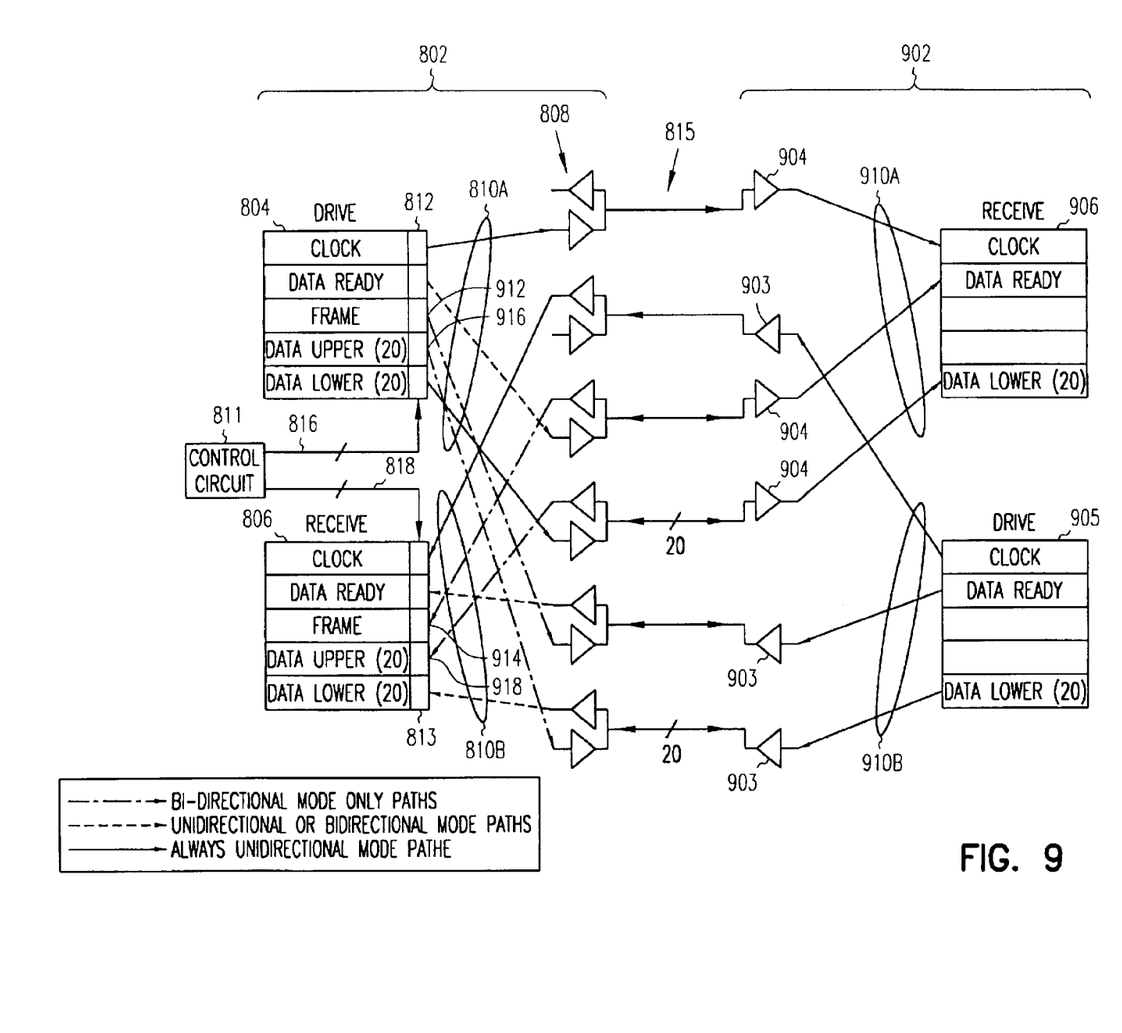
FIG. 9 is a block diagram showing another implementation of internal wire routings in a second mode according to an embodiment of the invention.

FIG. 9 is a block diagram showing another implementation of routing paths according to an embodiment of the invention. The Figure shows communication system 802 of FIG. 8 connected to another communication system 902 via the same communication lines 815 but operating in a uni-directional mode. Communication system 902 includes transmitters 903 and receivers 904. Transmitters 903 and receivers 904 are connected to a drive circuit 905 and a receive circuit 906 through a plurality of fixed wire routings 910a and 910b. In communication system 902, Frame and Data Upper signals are not available for use in drive circuit 905 and receive circuit 906. As described in FIG. 8, communication system 802 is capable of operating in both bi-directional and uni-directional modes. In FIG. 9, communication system 902 is only capable of operating in a uni-directional mode. Therefore, some of communication signals of communication system 802, such as Frame, Data Upper, are disabled such that wire routings 810a and 810b can still be utilized for operating in a uni-directional mode.

As shown in FIG. 9, communication system 802 communicates with communication system 902 in the uni-directional mode. In this mode, internal wire routings 810a–b are reconfigured. During the reconfiguration, control circuit 811 sends control signals to switching circuits 812 and 813 to disable the Frame signals indicated at lines 912 and 914 and the Data Upper signals indicated at lines 916 and 918. When the signals at lines 912–918 are disabled, wire routings 810a and 810b are configured for operating in the uni-directional mode to properly communicate with communication system 902. FIG. 9 shows that after the signals at lines 912–918 are disabled, wire routings 810a and 910a are properly matched for data transfer from drive circuit 804 to receive circuit 906. Wire routings 810b and 910b are also properly matched for data transfer from drive circuit 905 to receive circuit 806. The rate of data transfer between communication system 802 and 902 are still the same at the predetermined X bits/s. However, since the data transfer in a uni-directional mode, in each transfer communication lines 815 can transfer half as many data signals as in the case of bi-directional transfer (40X data signals per second).

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A communication system for transferring data on a plurality of communication lines, the communication system comprising:
 a control circuit for producing control signals for selecting a bi-directional mode at a first time and a uni-directional mode at a second time; and
 a plurality of transceivers connected to the control circuit to receive the control signals to transfer data on the communication lines using a first transfer method in the bi-directional mode, and to transfer data on the communication lines using a second transfer method in the uni-directional mode, wherein in the bi-directional mode, each of the transceivers is configured to transmit and receive data simultaneously on one of the communication lines, and wherein in the uni-directional mode, each of the transceivers is configured to transfer data only in one direction on one of the communication lines.

2. A communication system for transferring data on a plurality of communication lines, the communication system comprising:
 a control circuit for producing control signals for selecting a bi-directional mode and a uni-directional mode at different times; and
 a plurality of transceivers connected to the control circuit to receive the control signals to transfer data on the communication lines using a first transfer method in the bi-directional mode, and to transfer data on the communication lines using a second transfer method in the uni-directional mode, wherein in the first transfer method, each of the transceivers receives and transmits data simultaneously on a same communication line.

3. The communication system of claim 2, wherein in the second transfer method, one group of the transceivers is configured to receive data on one group of the communication lines and another group of the transceivers is configured to transmit data on another group of the communication lines.

4. A communication system for transferring data on a plurality of communication lines, the communication system comprising:
 a plurality of transceivers; and
 a control circuit connected to the transceivers to configure the transceivers to operate in a bi-directional mode and a uni-directional mode at different times using different transfer methods to transfer data on the communication lines, wherein in a first transfer method, each of the transceivers is configured to transmit and receive data simultaneously on one of the communication lines, and wherein in a second transfer method, each of the transceivers is configured to transfer data only in one direction on one of the communication lines.

5. A communication system for transferring data on a plurality of communication lines, the communication system comprising:
 a plurality of transceivers; and
 a control circuit connected to the transceivers to configure the transceivers to operate in a bi-directional mode and a uni-directional mode at different times using different transfer methods to transfer data on the communication lines, wherein in the bi-directional mode, each of the transceivers is configured to transmit and receive data simultaneously on a same communication line.

6. The communication system of claim 5, wherein in the uni-directional mode, one group of the transceivers is configured to receive data on one group of the communication lines and another group of the transceivers is configured to transmit data on another group of the communication lines.

7. A communication system for transferring data on a plurality of communication lines, the communication system comprising:
 a plurality of transceivers connected to the communication lines; and
 a control circuit connected to the transceivers, to produce first and second combinations of control signals, wherein in the first combination of the control signals, each of the transceivers is configured to transmit and receive data simultaneously on one of the communication lines, wherein in the second combination of the control signals, a first group of the transceivers is configured to operate as receivers and a second group of the transceivers is configured to operate as transmitters.

8. A communication system for transferring data on a plurality of communication lines, the communication system comprising:
 a plurality of transceivers connected to the communication lines; and
 a control circuit connected to the transceivers to produce a first combination of control signals and a second combination control signals, wherein in the first combination of the control signals, each of the transceivers is configured to operate as both receiver and transmitter wherein in the second combination, a first group of transceivers is configured to operate as receivers and a second group of transceivers is configured to operate as transmitters, wherein in the first combination of the control signals, each of the transceivers of the first and second groups of the of transceivers is configured to operate to receive and transmit data on one of the communication lines simultaneously.

9. The communication system of claim 8, wherein in the second combination of control signals, each transceiver of the first group of transceivers is configured to receive data on one of the communication lines, and each the transceiver of the second group of transceivers is configured to transmit data on one of the communication lines.

10. A transceiver for transferring data on a communication line in both bi-directional mode and uni-directional mode at different times, the transceiver comprising:
 a transmitting circuit having outputs connected to the communication line;
 a receiving circuit having inputs connected to the outputs of the transmitting circuit, wherein in the bi-directional mode, the transmitting circuit and the receiving circuit are configured to transmit and receive data simultaneously on the communication line, wherein the uni-directional mode, the transmitting circuit is configured to perform a terminating function and the receiving circuit is configured to receive data on the communication line; and
 a control circuit to selectively activate the transmitting circuit and the receiving circuit.

11. The transceiver of claim 10 further comprising a data source circuit, wherein in the bi-directional mode, the data source is configured to provide a true output data signal to a first output of the outputs of the transmitting circuit, wherein in the uni-directional mode, the data source is configured to provide a first terminating signal to the first output when the transceiver operates as a receiver, and to provide the true output data signal to the first output when the transceiver operates as a transmitter.

12. The transceiver of claim 11 further comprising a multiplexor, wherein in the bi-directional mode, the multiplexor is configured to provide a complement of the true output data signal to a second output of the outputs of the transmitting circuit, wherein in the uni-directional mode, the multiplexor is configured to provide a second terminating signal to the second output when the transceiver operates as a receiver, and to provide the complement of the true output data signal to the second output when the transceiver operates as a transmitter.

13. A transceiver for transferring data on a communication line in both bi-directional mode and uni-directional modes at different times, the transceiver comprising:
  a transmitting circuit having a first transmitter and a second transmitter, the first transmitter having a first output connected to the communication line, the second transmitter having a second output connected to the communication line;
  a receiving circuit having a first receiver and a second receiver, the first receiver having a first input connected to the first output, the second receiver having a second input connected to the second output, wherein in the bi-directional mode, the transmitters and the receivers are configured to transmit and receive data simultaneously on the communication line, wherein the uni-directional mode, the transmitters are configured to perform a terminating function and the receivers are configured to receive data on the communication line; and
  a control circuit to selectively activate the transmitting circuit and the receiving circuit.

14. The transceiver of claim 13 further comprising a data source circuit, wherein in the uni-direction mode, the data source is configured to provide a first terminating signal to the first output.

15. The transceiver of claim 14 further comprising a multiplexor, wherein in the uni-direction mode, the multiplexor is configured to provide a second terminating signal to the second output.

16. A transceiver for transferring data on a communication line in both bi-directional mode and uni-directional mode at different times, the transceiver comprising:
  a transmitting circuit having outputs connected the communication line; and
  a receiving circuit having inputs connected to the outputs of the transmitting circuit, wherein in the bi-directional mode, the transmitting circuit and the receiving circuit are configured to transmit and receive data simultaneously on the communication line, wherein the uni-directional mode, the transmitting circuit is configured to transmit data on the communication line and the receiving circuit is not operational.

17. The transceiver of claim 16, wherein the outputs of the transmitting circuit are configured to provide differential signals.

18. The transceiver of claim 16 further comprising a data source circuit, wherein in the uni-direction mode, the data source circuit is configured to provide a true output data signal to a first output of the outputs of the transmitting circuit.

19. The transceiver of claim 18 further comprising a multiplexor, wherein in the uni-direction mode, the multiplexor is configured to provide a complement of the true output data signal to a second output of the outputs of the transmitting circuit.

20. A transceiver for transferring data on a communication line in both bi-directional mode and uni-directional mode at different times, the transceiver comprising:
  a transmitting circuit having a first transmitter and a second transmitter, the first transmitter having a first output connected to the communication line, the second transmitter having a second output connected to the communication line; and
  a receiving circuit having a first receiver and a second receiver, the first receiver having a first input connected to the first output, the second receiver having a second input connected to the second output, wherein in the bi-directional mode, the transmitters and the receivers are configured to transmit and receive data simultaneously on the communication line, wherein the uni-directional mode, the transmitting circuit is configured to transmit data on the communication line and the receiving circuit is not operational.

21. The transceiver of claim 20, wherein the first and second outputs of the transmitters are configured to provide differential signals.

22. The transceiver of claim 20 further comprising a data source circuit, wherein in the uni-direction mode, the data source circuit is configured to provide a true output data signal to the first output.

23. The transceiver of claim 22 further comprising a multiplexor, wherein in the uni-direction mode, the multiplexor is configured to provide a complement of the true output data signal to a second output.

24. A communication system for transferring data on a plurality of communication lines, the communication system comprising:
  a plurality of transceivers connected to the communication lines, the transceivers capable of operating in a bi-directional mode at a first time and in a uni-directional mode at a second time; and
  a plurality of internal wire routings connected to the transceivers, the internal wire routings being connected in a first way in the bi-directional mode and in a second way when in the uni-directional mode, wherein in the first way, the wire routings are configured to allow each of the transceivers to transmit and receive data simultaneously one of the communication lines, and wherein in the second way, the wire routines are configured to allow each of the transceivers to transfer data only in one direction on one of the communication lines.

25. A computing system communicating via communication lines, the computing system comprising:
  a first computer having a first communication system; and
  a second computer having a second communicating system, the second communicating system connected to the first communicating system via the communication lines, the first communication system comprising:
  a plurality of transceivers; and
  a control circuit connected to the transceivers to switch the transceivers to operate in a bi-directional mode using a first transfer method and in a uni-directional mode using a second transfer method, wherein in the first transfer method, each of the transceivers is configured to transmit and receive data simultaneously on one of the communication lines, and wherein in the second transfer method, each of the transceivers is configured to transfer data only in one direction on one of the communication lines.

26. The communication system of claim 25, wherein the first communicating system is configured to operate in both the bi-directional and uni-directional modes, and wherein the second communication system is configured to operate only in the uni-directional mode.

27. A method of communicating between a bi-directional communication system and a uni-directional communication system, the method comprising:

receiving a mode signal to switch the bi-directional communication system from operating in a bi-directional mode to operating in a uni-directional mode;

switching each transceiver of a first group of transceivers from simultaneously receiving and transmitting data on a communication line of a first group of communication lines to receiving data only on the communication line of the first group of communication lines; and switching each transceiver of a second group of transceivers from simultaneously receiving and transmitting data on a communication line of a second group of communication lines to transmitting data only on the communication line of the second group of communication lines.

28. A method of configuring a communication system, the method comprising:

activating a mode signal to convert the communication system from operating in a bi-directional mode to operating in a uni-directional mode;

configuring a plurality of internal wire routings to enable the internal wire routings to communicate in the uni-directional mode;

activating a combination of control signals to divide a plurality of transceivers of the communication system into a first group of transceivers and a second group of transceivers;

enabling the first group of transceivers to only receive data on the communication lines, wherein in the bi-direction mode, each transceiver of the first group of transceivers transmits and receives data simultaneously on one of the communication lines; and enabling the second group of transceivers to only transmit data on the communication lines, wherein in the bi-direction mode, each transceiver of the second group of transceivers transmits and receives data simultaneously one of the communication lines.

29. The method of claim 28, wherein configuring the plurality of internal wire routings including disabling selected communication signals on selected communication lines.

30. A method of configuring a communication system, the method comprising:

receiving a mode signal to switch the communication system from operating in a bi-directional mode to operating in a uni-directional mode, the communication system including a plurality of transceivers;

reconfiguring internal wire routings of the communication system from operating in the bi-directional mode to operating in a uni-directional mode, wherein in the bi-direction mode, each of the transceivers transmit and receive data simultaneously on one of the communication lines; and Performing terminating function at the first group of transceivers.

31. The method of claim 30, wherein performing the terminating function includes matching output resistance of each of the transceivers with resistance of each of the communication lines.

* * * * *